United States Patent [19]
Gifford

[11] 3,774,921
[45] Nov. 27, 1973

[54] MECHANICAL VARIABLE TORQUE CHUCK

[75] Inventor: Harry D. Gifford, Washougal, Wash.

[73] Assignee: Tidland Corporation, Camas, Wash.

[22] Filed: Feb. 14, 1972

[21] Appl. No.: 225,848

[52] U.S. Cl. .................................. 279/2, 242/72 R
[51] Int. Cl. ............................................ B23b 31/40
[58] Field of Search ................. 279/1 Q, 2; 242/72; 82/44; 269/48.1

[56] References Cited
UNITED STATES PATENTS
3,584,714  6/1971  Ryswick .............................. 242/72

Primary Examiner—Francis S. Husar
Attorney—Stephen W. Blore et al.

[57] ABSTRACT

A chuck for a web roll, having a mechanism for translating, proportionally, the web pulling force into a gripping force of the chuck on the roll.

3 Claims, 4 Drawing Figures

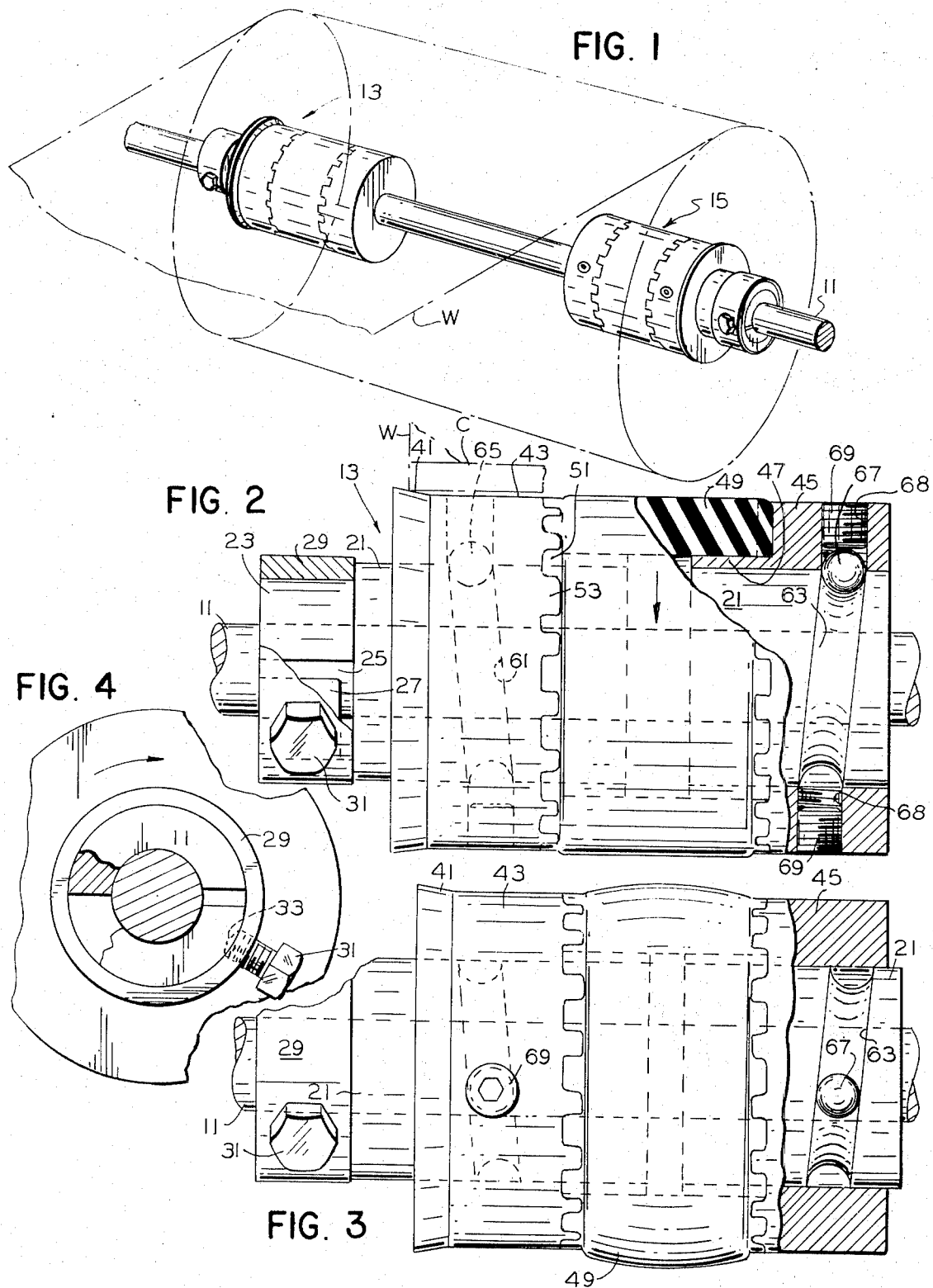

MECHANICAL VARIABLE TORQUE CHUCK

BACKGROUND OF THE INVENTION

Paper roll chucks usually apply a constant force against a roll, whose web is being wound onto or unwound from the core of the roll. Some webs require a greater force for winding than others. An increase in tension can cause erratic slipping between the chuck and the roll to cause poor winding.

It has been proposed to provide a mechanical chuck designed so that the frictional forces between the chuck and a winding core automatically increase as the web tension increases.

It is an object of the invention to provide such an automatic chuck, and particularly one which is simple, effective and relatively inexpensive.

SUMMARY OF THE INVENTION

In accordance with the above object, the invention comprises relatively movable core mounting parts, and a camming mechanism between the parts for expanding an elastomer core engaging member automatically and in proportion to increases in web tension whereby to avoid slippage.

BRIEF DESCRIPTION OF THE DRAWINGS

FIG. 1 is a perspective view of two chucks of the invention;

FIG. 2 is a side elevational view of one invention chuck, showing the same mounted on a shaft and with parts broken away;

FIG. 3 is a view like FIG. 2, but showing the elastomer gripping member as having been expanded;

FIG. 4 is a fragmentary end view of the chuck.

FIG. 1 discloses a shaft 11 having a pair of chucks 13 and 15 mounted thereon in spaced relation to receive the core C (FIG. 2) from which the web W (FIGS. 1 and 2) of the paper roll is pulled (or onto which a paper web is wound).

The chucks are of identical construction so only the details of chuck 13 will be explained. It has a tubular body 21 slidably fitting on the shaft 11, and has a reduced end portion 23, which is formed with an L-shaped slot 25 to provide a flexible tab 27. A collar 29 fits on the reduced portion 23, and a tightening screw 31 threads through the collar 29 and engages in a dimple 33 formed in the tab 27. When the screw 31 is tightened, it presses the flexible tab against the shaft 11 to hold the chuck in a desired position.

In such position, a frustoconical knurled end portion 41 of an outer core stop 43 bears against the end of the core C. An inner core stop 45 also slidably fits on the body 21 in spaced relation from the outer core stop 43. Each of the core stops has an inwardly projecting reduced tubular mounting portion 47 on which an elastomer tire 49 has slip fit. The tire and the core stops have an interdigitated crenelated engagement, with the crenelations 51 on the tire fitting in complementary slots in the inner edge of a heavy flange portion of the associated core stop. Conversely, each heavy flange portion has crenelations 53 fitting in complementary slots formed in the end faces of the elastomer tire 49.

The stops 43 and 45 and the tire 49 constitute an outer assembly which is turnably mounted on the body 21.

The tubular chuck body 21 is provided with a pair of grooves 61 and 63 formed therearound, each to receive the inner portion of a ball 65 for groove 61, and a ball 67 for groove 63. The balls are dropped into place through tapped holes 68 closed by plugs, one plug 69 being shown in FIG. 2.

The planes of the grooves 61 and 63 are oblique to the axis of the shaft 11 and converge downwardly and inwardly toward one another as the parts are shown in FIGS. 2 and 3.

FIG. 2 shows that, in the rest or relaxed condition of the tire, the balls 65 and 67 are disposed in the axially outermost portions of their respective grooves. Thus any movement of the outer assembly causes the balls to travel inwardly toward one another, whereby to compress and expand the tire 49.

The operation of the device is as follows: when tension is applied to the web W (FIG. 1), this tends to turn the roll and its core C about the shaft 11. Since the ends of the core are jammed against the knurled margins 41 of the stops, the core urges the outer assembly to turn, which it does. In so doing, it carries the balls 65 and 67 circumferentially with it. The grooves cause the balls to move axially inwardly, so that they cause similar inward movement of the stops, whereby to compress the tire 49 and cause it to bulge outwardly (FIG. 3) and more tightly frictionally engage the paper core. The magnitude of the frictional engagement will be such as to preclude slippage between the core and the chucks.

What is claimed is:

1. A torque responsive core chuck for a shaft comprising a tubular core engaging means which includes a pair of ring members on opposite sides of an elastomer member which is adapted for radial expansion upon endwise compression to engage a core with a pressure proportioned to the magnitude of the compressive force, means prohibiting relative turning movement between the ring members but permitting relative axial movement therebetween to compress said elastomer member, and mounting means for mounting said tubular core engaging means on a shaft for conjoint turning movement of said ring members relative to said shaft and responsive to such conjoint turning movement to force said ring members inwardly toward one another to compress said elastomer member.

2. A torque responsive core chuck as set forth in claim 1 wherein the elastomer member and ring members have interdigitated portions to preclude relative turning movement of the ring members relative to one another and to said elastomer member.

3. A torque responsive chuck as set forth in claim 1 wherein the mounting means comprises a sleeve to fit about said shaft in fixed relation thereto and having a pair of grooves about the exterior of said sleeve lying in nonparallel planes, and a pair of balls riding in said grooves and fitting in sockets in said ring members.

* * * * *